United States Patent [19]

Bullock

[11] Patent Number: 4,841,816
[45] Date of Patent: Jun. 27, 1989

[54] HYDRAULIC CONTROL FOR A POWER TRANSMISSION WITH A MANUAL RANGE SELECTOR VALVE

[75] Inventor: Benton L. Bullock, New Palestine, Ind.

[73] Assignee: General Motors Corporation, Detroit, Mich.

[21] Appl. No.: 230,813

[22] Filed: Aug. 11, 1988

[51] Int. Cl.$^4$ .............................................. B60K 41/06
[52] U.S. Cl. ........................................ 74/866; 74/869
[58] Field of Search .................................. 74/866–869

[56] References Cited

U.S. PATENT DOCUMENTS

| | | | |
|---|---|---|---|
| 3,937,108 | 2/1976 | Will | 74/866 |
| 4,345,489 | 8/1982 | Muller et al. | 74/866 X |
| 4,414,863 | 11/1983 | Heino | 74/866 |
| 4,628,772 | 12/1986 | Nishikawa et al. | 74/866 |
| 4,635,508 | 1/1987 | Tatsumi | 74/866 |

FOREIGN PATENT DOCUMENTS 256653 12/1985 Japan.

*Primary Examiner*—Dwight G. Diehl
*Attorney, Agent, or Firm*—Donald F. Scherer

[57] ABSTRACT

A control for a power transmission has a plurality of shift valves that are solenoid controlled, during normal operation, to establish the transmission ratios. A manual valve having a rotary valve is hydraulically connected with the shift valves and maintained in an inoperative position during normal operation. The manual valve is manipulable by an operator to selectively direct hydraulic signals to the shift valves if the solenoid controls become inoperative. The manual valve permits selection of a forward drive, a reverse drive and a neutral condition so that vehicle operation can continue when electrical power is unavailable for the solenoids.

1 Claim, 2 Drawing Sheets

HYDRAULIC CONTROL FOR A POWER TRANSMISSION WITH A MANUAL RANGE SELECTOR VALVE

The invention herein described was made in the course of work under a contract or subcontract thereunder with the Department of the Army.

BACKGROUND OF THE INVENTION

This invention relates to electro-hydraulic controls for power transmissions and particularly to such controls having manual override controls when the electrical functions are inoperative.

It is desirable to have "limp home" capabilities in track laying vehicles and other heavy construction equipment when an electrical outage occurs. This alleviates the need for heavy towing equipment to be maintained in the field. Since the vehicle may have to negotiate steep grades and perhaps carry a load when full functioning of the transmission is not available, it is preferable to provide low, reverse and neutral selection through manual manipulation.

SUMMARY OF THE INVENTION

The present invention provides for "limp home" drive in both forward and reverse operation when electrical power is unavailable. In a control system utilizing this invention, the transmission is normally controlled by electrically actuated solenoids which are opened and closed selectively to pressurize and exhaust control chambers on a plurality of shift valves. These solenoids are normally closed, that is, when electrical power is not applied to the solenoid, the control chamber can be pressurized if hydraulic power is available to the chamber.

With this type of control, it is necessary to have a positive neutral valve so that the vehicle transmission is maintained in neutral when the vehicle power source is initially started and the selective energization of the solenoids has not been established. It is also desirable to permit neutral selection in the power transmission, when the vehicle is sitting idle with the power source operating, without the need to apply the vehicle brakes.

It is therefore an object of this invention to provide an improved electro-hydraulic control for a power transmission wherein a manual valve is operator manipulable to provide forward, reverse and neutral operation in the transmission when electrical functions are unavailable.

It is another object of this invention to provide an improved electro-hydraulic control for a power transmission having a plurality of electrically controlled ratio establishing solenoid members for selectively positioning a plurality of ratio control valves to establish drive ratios and neutral in the transmission and wherein all of the ratio establishing solenoids are closed when electrical activity ceases and a manually controlled valve member is manipulable to position the ratio control valves to establish a forward ratio, reverse ratio or neutral condition in the transmission to permit continuing power transmission when electrical power is unavailable.

These and other objects and advantages of the present invention will be more apparent from the following description and drawings.

DESCRIPTION OF AN EXEMPLARY EMBODIMENT

Figure 1A:
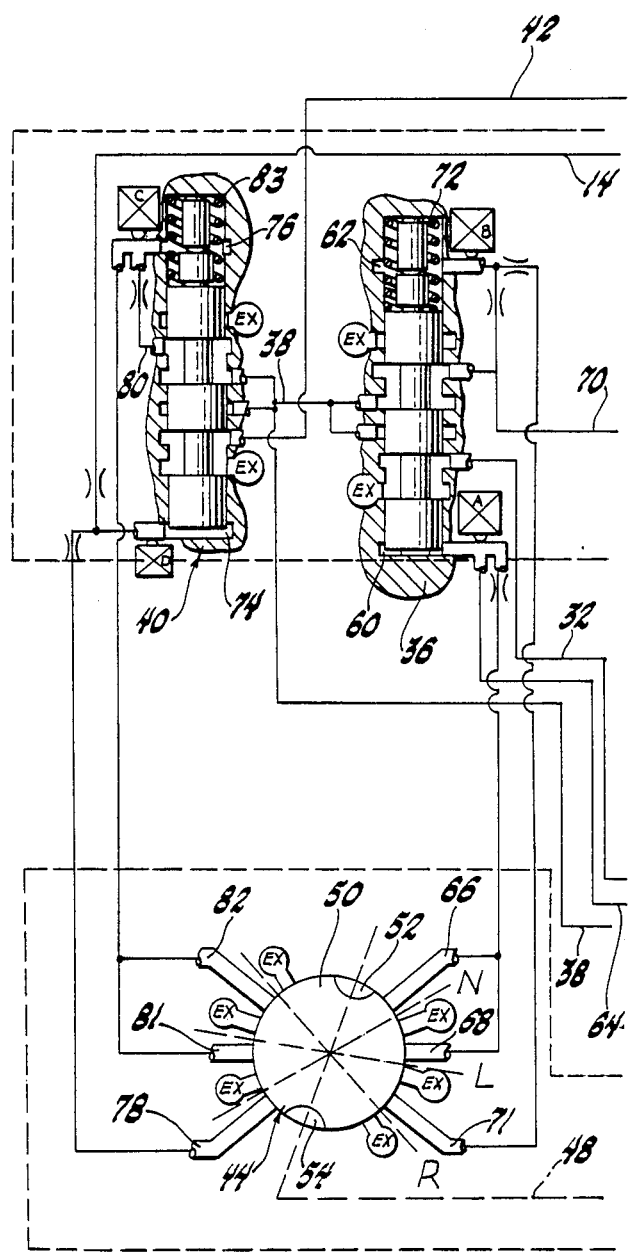
FIGS. 1A and 1B are schematic representations of an electro-hydraulic control incorporating an exemplary embodiment of the invention.
Figure 1B:
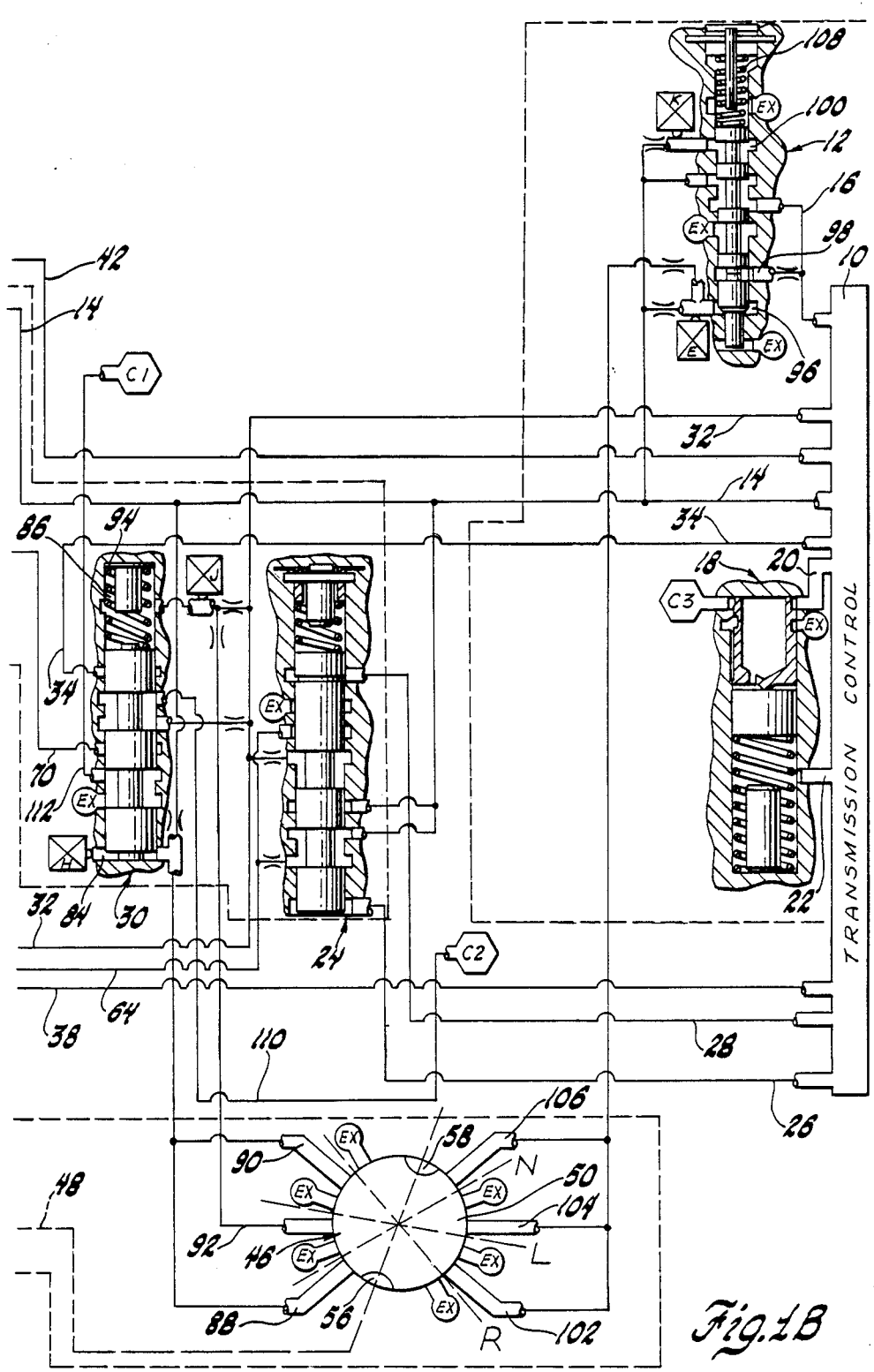

Referring to the drawings, there is seen in FIG. 1B, a transmission control 10 in which is contained a plurality of conventional transmission control and pressure generating devices, such as an input and an output hydraulic pump, a main pressure regulator, a plurality of shift valves and governor valves which are provided to establish various pressure signals useful in controlling the selectively engageable friction devices commonly used in power transmissions, such as that shown in U.S. Pat. No. 4,070,927 to Polak, issued Jan. 31, 1978. The transmission control can include vehicle brake control valves and a torque converter with a pressure control mechanism. These also are conventional devices utilized in many automatic power transmissions.

The transmission control will also include other valve mechanisms, some of which are shown in FIGS. 1A and 1B. These valve mechanisms include a manual hold regulator valve 12 which is in fluid communication with the transmission control 10 via a main signal pressure passage 14 and a hold pressure passage 16. The main signal pressure in passage 14 is generated by a conventional valve mechanism, such as a downstream regulator which produces a substantially constant pressure. A valve for establishing this signal pressure is disposed in the control 10.

The hold pressure passage 16 distributes a modified signal pressure to valve elements disposed within the transmission control 10 to prevent certain shift functions, such as upshifting when a manual low range has been selected, unless high torque demands are present based on operator throttle demand. This type of extended upshift pattern is well known.

A trimmer valve 18 is connected with the transmission control 10 through a C3 trimmer passage 20 and a trim boost pressure passage 22. The trimmer valve 18 is also connected with a C3 friction device which is engaged during the establishment of both the forward low ratio and the reverse ratio.

The pressure in passage 20 is established by some of the valves within the transmission control 10 in a conventional manner whenever the operator selects either low or reverse operation. The pressure in the trim boost passage 22 varies in accordance with throttle demand such that the trimmer valve 18 will control the pressure rise and initial engagement of the C3 friction device. The operation of these trimmer valves is well known.

A forward/reverse inhibit valve 24 is disposed in fluid communication with the transmission control 10 through an output governor passage 26 and an input governor passage 28 and also through the main signal passage 14. A reverse shift valve 30 is in fluid communication with the transmission control 10 through a reverse passage 32 and a C2 feed passage 34.

A forward shift valve 36 is in fluid communication with the transmission control 10 through a main pressure passage 38. The pressure in main passage 38 is established by a conventional pressure regulator valve disposed within the transmission control 10 and is generally the highest pressure within the control system.

A neutral shift control valve 40 is in fluid communication with the transmission control 10 via the main pressure passage 38, the main signal passage 14 and a priority passage 42. The control valving also includes a pair of manual range selector valves 44 and 46 which are interconnected by a mechanical linkage indicated by line 48. Each of the manual valves 44 and 46 have a rotary spool valve 50 in which is formed a pair of substantially semicircular fluid passages 52, 54 in valve 44, and 56, 58 in valve 46. The valve 44 has six solenoid control passages and six exhaust passages. The valve 46 also has six solenoid control passages and six exhaust passages.

In each of the valves 44 and 46, the respective valve spools 50 are rotatable to a null position shown, a Neutral "N" position, a Low "L" position and a Reverse "R" position. These positions are selected by the operator when necessary to provide control of the solenoids A and B associated with the forward shift valve 36, C and D associated with the neutral shift valve 40, solenoid E associated with the manual hold regulator valve 12 and solenoids H and J associated with the reverse shift valve 30.

Each of the solenoids are of the normally closed type. That is, whenever electrical energy is not supplied to the solenoids, each solenoid will be operated to close an associated passage which, in this control, is an exhaust passage. These are conventional solenoid valves and it is well known to use either normally open or normally closed valves to provide control functions.

The forward shift valve 36 has a pair of control chambers 60 and 62 controlled by the solenoids A and B, respectively. The chamber 60 is connected with the forward/reverse inhibit valve 24 through an inhibit passage 64. The chamber 60 is also in fluid communication with two of the solenoid control ports 66 and 68 of the manual valve 44. Control chamber 62 is in fluid communication with a passage 70 communicating with the reverse shift valve 30 and selectively with the main passage 38 through the forward shift valve 36. The chamber 62 is also in fluid communication with passage 71 of the manual valve 44. The control chamber 62 has a spring 72 disposed therein which urges the valve spool of the forward shift valve 36 toward the control chamber 60.

The neutral shift valve 40 has a pair of control chambers 74 and 76 which are controlled by the solenoids D and C, respectively. The chamber 74 is in fluid communication with the main signal passage 14 and with passage 78 of the manual valve 44. Chamber 76 is in fluid communication with a passage 80 which is selectively connectible with the main passage 38 through the neutral shift valve 40 and with passages 81, 82 of the manual valve 44. A spring 83 urges the spool of valve 40 toward chamber 74.

The reverse shift valve 30 has a pair of control chambers 84 and 86 controlled by the solenoids H and J, respectively. The control chamber 84 is in fluid communication with the main signal passage 14 and with passages 88 and 90 of the manual valve 46. The chamber 86 is in fluid communication with the reverse passage 32 and with passage 92 of the manual valve 46. The chamber 86 has disposed therein a spring 94 which urges the valve spool of the reverse shift valve 30 toward the control chamber 84.

The manual hold regulator valve 12 has a plurality of control chambers 96, 98 and 100. Chamber 96 is controlled by solenoid E and is disposed in fluid communication with the main signal passage 14 and with passages 102 and 104 and 106 of the manual valve 46. The chamber 100 is a differential area chamber and is in fluid communication with the main signal passage 14. The pressure chamber 100 is controlled by the operation of solenoid K. The chamber 98 is in fluid communication with the pressure in the hold regulator passage 16.

The function of the hold regulator valve 12 is to regulate the pressure level in the hold regulator passage 16. To accomplish this pressure regulation, the valve 12 operates as a downstream regulator valve. That is, the valve will be moved to permit fluid communication between passages 14 and 16 whenever the controlled pressures 96, 98 and 100 are less than the force within a spring 108 which urges the hold regulator valve toward the position shown. Since the outgoing or downstream pressure in passage 16 provide part of the control function, this is a downstream regulator valve.

During normal operation, the solenoids controlling the valve shown in FIGS. 1A and 1B are controlled by a conventional electronic control mechanism which is not shown, and may be incorporated into the transmission control 10 or placed elsewhere on the vehicle. When electrical power is available and reverse operation is selected, the electrical control system will energize solenoids B, C, E and H. With these solenoids energized, the spool of the neutral shift valve 40 will move upward against the spring 83, the spool of the forward shift valve 36 will move upward against the spring 72, the reverse shift valve 30 will be maintained in the position shown and the hold regulator valve 12 will generate a pressure determined by the pressure in the control areas 98 and 100. With the valves thus positioned, fluid pressure in the main passage 38 is distributed through the forward shift valve 36 to the reverse passage 32 which is distributed by the reverse valve 30 to a C2 apply passage 110 which is connected to a friction device C2. The friction device C3 is energized by the transmission control 10 and is not affected by the electronic control system. With the devices C2 and C3 energized, the transmission is conditioned for reverse operation.

When the transmission is conditioned for neutral, solenoids A, D, E and H are energized such that the shift valves 30, 36 and 40 will be maintained in the position shown and none of the friction devices will be pressurized.

To establish a forward low ratio, solenoids A, C, E and J are energized. With these solenoids energized, the spool of the neutral shift valve 40 will be moved upwardly, the forward shift valve 36 will be maintained in the position shown and the spool of the reverse shift valve 30 will be moved upwardly against the spring 94. With the valves in this condition, main pressure in passage 38 is distributed through the forward shift valve 36 and the reverse shift valve 30 to a C1 apply passage 112 which is connected to a friction device C1. Friction device C3 will be energized by the normal transmission control 10 and is unaffected by the electronic control mechanism. With the friction devices C1 and C3 energized, the transmission is conditioned for low speed operation.

For a description of a transmission which will accomplish the forward and reverse ratios as described, U.S. Pat. No. 4,070,927 issued to Polak Jan. 31, 1978, may be reviewed. There are, of course, many other planetary gear arrangements which can be utilized with the subject control.

If the electric power is not available, the transmission will have pressure available but the valves will not normally be operable to permit the establishment of a drive ratio within the transmission. With the present invention, the manual valves 44 and 46 can be manipulated to establish the neutral, low and reverse drive ratios and permit "limp home" capabilities. That is, the vehicle can be driven, however, maximum speed cannot be attained.

To establish the reverse ratio, the manual valves 44 and 46 are manipulated such that the fluid passages 52, 54 and 56, 58, respectively, are aligned at the reverse "R" position. In this position, the passages 71 and 82 are exhausted. This effectively provides the same function as energizing solenoids C and B. The manual valve 46 is effective to exhaust passages 90 and 102 which provide the same function as energizing solenoids H and E.

The inlet passages to each of the control solenoids have restrictions or orifices formed therein. Thus, when the manual valves 44 and 46 connect the solenoids passages to exhaust, the respective control chambers are exhausted without bleeding an excess of hydraulic fluid from the system to exhaust.

To establish neutral in the transmission, the manual valves 44 and 46 are moved to the Neutral "N" position. In this position, the passages 66 and 78 are connected to exhaust by valve 46 and the passages 106 and 88 are connected to exhaust by the valve 46. This effectively exhausts the control chambers controlled by the solenoids D, A. H and E. As described above, the exhausting of these control chambers establishes a neutral drive condition within the transmission.

To establish a low drive ratio, the manual valves 44 and 46 are moved to the Low "L" position. In this position, the manual valve 44 is effective to exhaust passages 68 and 81. This effectively exhausts solenoids A and C. Manual valve 46 is effective to exhaust passages 92 and 104 which effectively exhausts solenoids J and E. This is the same condition as would be accomplished to establish low ratio if electrical power were available.

With the manual override mechanism described above, the present invention will permit the operator to drive the vehicle to a location where repair of the electrical system can be accomplished. Thus, it will not be necessary during an electrical failure that a towing vehicle and/or a service mechanic be brought to the location of the vehicle. This will, of course, save repair expense and the time during which a mechanic is engaged in vehicle repair since travel time will not be necessary for the mechanic. The available towing vehicles can be used to retrieve vehicles that are disabled due to mechanical or hydraulic malfunction and are not drivable. This will reduce the number of tow vehicles required or reduce the waiting time of a disabled vehicle.

When the manual valves 44, 46 are in the null position shown, all of the control passages are blocked. Thus, during normal operation, these passages will not affect the transmission control.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in power transmission controls having a plurality of shift control valve means including a forward valve means and a reverse valve means; forward-reverse direction control valve means; neutral valve means; regulator valve means; a plurality of solenoid means for controlling fluid pressure at control areas on said forward-reverse direction control valve means, said forward valve means and said reverse valve means, respectively; a pair of solenoid control means for controlling fluid pressure at a pair of control areas on the neutral valve means; solenoid valve means for controlling fluid pressure at a control area on said regulator valve means, each said solenoid means being controlled by electrical signals, when electrical power is available, to condition the power transmission for forward-reverse and neutral operation and said solenoids being ineffective when electrical power is not available, wherein the improvement comprises: a pair of interconnected manual valve means each having an inactive position, a neutral position, a forward position and a reverse position; one of said manual valve means being operable to exhaust one control area at the neutral valve means and one control area at a forward shift valve when the neutral position is selected, to exhaust the other control area on the neutral valve means and the one control area at the forward shift valve when the forward position is selected, to exhaust other control area on the neutral valve means and another control area at the forward shift valve when the reverse position is selected; said other manual valve means being operable to exhaust the control area on said regulator valve means when the neutral, forward and reverse positions are selected respectively, and to exhaust one control area on a reverse shift valve when the neutral and reverse positions are selected and to exhaust another control area on the reverse shift valve when the forward position is selected; and said manual valve means being operable to prevent unrequested exhausting of said control areas when the inactive position is selected.

* * * * *